(12) United States Patent
Roy et al.

(10) Patent No.: US 9,900,244 B2
(45) Date of Patent: *Feb. 20, 2018

(54) PREDICTING ROUTE UTILIZATION AND NON-REDUNDANT FAILURES IN NETWORK ENVIRONMENTS

(71) Applicant: Amazon Technologies, Inc., Seattle, WA (US)

(72) Inventors: Sonali Roy, Seattle, WA (US); Samuel Joseph Mortimer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 193 days.

This patent is subject to a terminal disclaimer.

(21) Appl. No.: 14/673,806

(22) Filed: Mar. 30, 2015

(65) Prior Publication Data

US 2015/0207727 A1 Jul. 23, 2015

Related U.S. Application Data

(63) Continuation of application No. 13/766,674, filed on Feb. 13, 2013, now Pat. No. 8,995,249.

(51) Int. Cl.
*H04L 12/707* (2013.01)
*H04L 12/24* (2006.01)
(Continued)

(52) U.S. Cl.
CPC .......... *H04L 45/22* (2013.01); *H04L 41/0663* (2013.01); *H04L 41/0668* (2013.01);
(Continued)

(58) Field of Classification Search
CPC ......... H04L 45/00; H04L 41/00; H04L 47/00; H04Q 11/00; H04Q 2011/00
See application file for complete search history.

(56) References Cited

U.S. PATENT DOCUMENTS 6,069,894 A * 5/2000 Holender ........... H04Q 11/0478
370/397
6,393,386 B1 5/2002 Zager et al.
(Continued)

OTHER PUBLICATIONS

U.S. Appl. No. 13/766,674, filed Feb. 13, 2013, Sonali Roy et al.

*Primary Examiner* — Andrew Lai
*Assistant Examiner* — Sumitra Ganguly
(74) *Attorney, Agent, or Firm* — Robert C. Kowert; Meyertons, Hood, Kivlin, Kowert & Goetzel, P.C.

(57) ABSTRACT

A network analysis module may obtain information including but not limited to network traffic and topology information for a network environment including multiple separate networks and physical connections between the networks. The module generates a network topology model including but not limited to extreme-case failure or break information according to the network topology information, and applies the historical network traffic information to the network topology model to predict future expected normal traffic load and extreme-case traffic load for each route over the physical connections between the networks. Output may include one or more reports for each route, each report indicating the historical and predicted traffic levels for both normal and extreme-case scenarios of a respective route.

20 Claims, 9 Drawing Sheets

(51) Int. Cl.
*H04L 12/801* (2013.01)
*H04Q 11/00* (2006.01)

(52) U.S. Cl.
CPC .......... *H04L 41/147* (2013.01); *H04L 47/127* (2013.01); *H04Q 11/0066* (2013.01); *H04L 41/12* (2013.01); *H04Q 2011/009* (2013.01); *H04Q 2011/0081* (2013.01)

(56) References Cited

U.S. PATENT DOCUMENTS

| | | | |
|---|---|---|---|
| 7,391,742 B2 * | 6/2008 | Zabele | H04L 45/00 370/254 |
| 7,774,440 B1 * | 8/2010 | Bagrodia | H04L 41/0816 703/1 |
| 8,018,860 B1 | 9/2011 | Cook | |
| 8,145,745 B1 * | 3/2012 | Ge | H04L 41/0677 709/224 |
| 8,654,629 B1 | 2/2014 | Craig et al. | |
| 8,995,249 B1 * | 3/2015 | Roy | H04L 41/147 370/216 |
| 2003/0058798 A1 | 3/2003 | Fleischer et al. | |
| 2004/0010577 A1 * | 1/2004 | Yegenoglu | H04L 41/083 709/223 |
| 2004/0049595 A1 | 3/2004 | Sun et al. | |
| 2004/0213221 A1 * | 10/2004 | Civanlar | H04L 29/06 370/389 |
| 2007/0192406 A1 * | 8/2007 | Frietsch | G06F 1/3209 709/203 |
| 2008/0175150 A1 | 7/2008 | Bolt et al. | |
| 2010/0302935 A1 * | 12/2010 | Zhang | H04L 45/02 370/218 |
| 2011/0085445 A1 * | 4/2011 | Klincewicz | H04L 41/145 370/238 |
| 2011/0141877 A1 | 6/2011 | Xu et al. | |
| 2012/0236729 A1 | 9/2012 | Heinz et al. | |
| 2012/0303413 A1 | 11/2012 | Wang et al. | |
| 2012/0314573 A1 | 12/2012 | Edwards et al. | |
| 2013/0010610 A1 | 1/2013 | Karthikeyan et al. | |
| 2013/0017796 A1 | 1/2013 | Milner et al. | |

\* cited by examiner

PREDICTING ROUTE UTILIZATION AND NON-REDUNDANT FAILURES IN NETWORK ENVIRONMENTS

This application is a continuation of U.S. patent application Ser. No. 13/766,674, filed Feb. 13, 2013, now U.S. Pat. No. 8,995,249, which is hereby incorporated by reference in its entirety.

BACKGROUND

Many entities (e.g., companies and other organizations) establish network environments that include two or more separate networks each including numerous computing systems and networking devices. Two or more of the entity's networks may be co-located in a facility, for example in a data center. Instead or in addition, two or more of the entity's networks may each be located in different facilities or data centers at different geographical locations. Often, an entity that implements such a network environment requires high-speed, high-bandwidth, and reliable connectivity between the networks, including those located in different data centers. Often, dedicated physical connections, for example fiber optic connections, are used to provide such connectivity between the separate networks and/or data centers.

A physical connection, e.g. a fiber optic connection, between two networks is not necessarily a single continuous cable connecting the two networks. Instead, such a connection may generally include two or more sections of cable that interconnect between networking devices, for example routers, repeaters, switches, and so on, on the path between the networks. Furthermore, a given physical connection between two networks may follow a physical path that takes the connection through one or more facilities or data centers, through various conduits, along or crossing the paths of other such physical connections, and so on. In other words, the physical network infrastructure of such a network environment is typically complex.

To provide redundancy in such network environments, multiple distinct physical connections (e.g., two or more distinct routes using fiber optic technology) may be designated between two given networks that are co-located in a data center or between two given networks that are located in different data centers, with one route typically designated as the primary route and one or more other routes as alternative routes. If the primary route between two networks goes down, for example as the result of a fiber optic cable being inadvertently cut or of a failure at a networking device on the route, the route's data flow may be redirected onto an alternative route or redistributed onto two or more alternative routes between the two networks.

However, each route (e.g., each fiber optic connection between the two networks) has a capacity limit as to how much total data flow the route can handle. In addition, each of the alternative routes may also be carrying data between two or more networks at some fraction of its capacity on at least a portion of the route. Further, data flow on the routes may vary with time, for example data flow may tend to increase over time on a given route or routes. Due to these and other complexities of the physical network infrastructure in addition to the complexities of network usage and data flow, in such network environments, it has conventionally been difficult to predict network behavior given the many possible failure scenarios and to plan for sufficient redundancy and capacity on the various routes between networks to support a level of reliability that such entities typically require.

Figure 1:
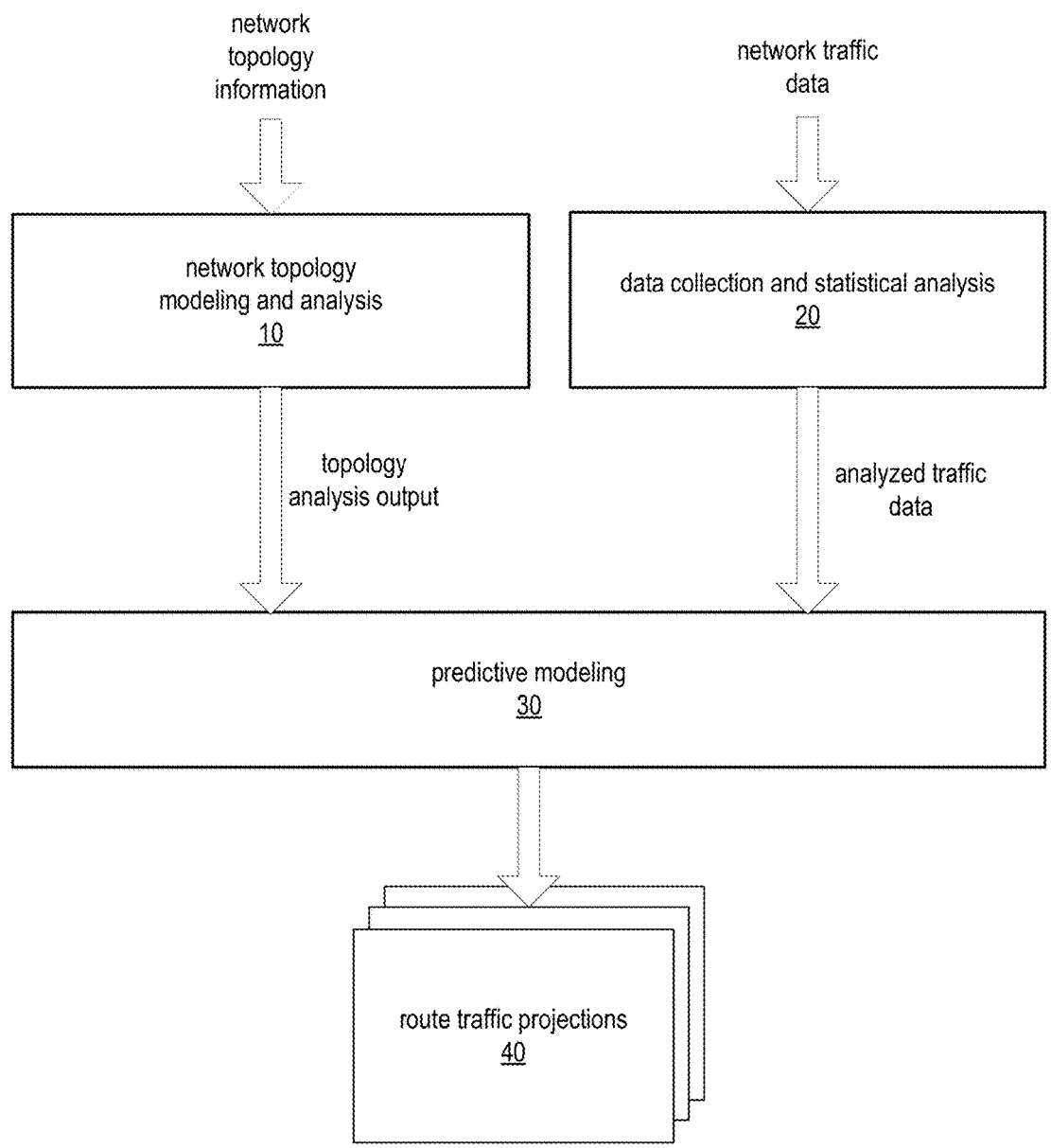
FIG. 1 is a block diagram illustrating example data flow in and operations of a network analysis method, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for predicting route utilization and non-redundant failures in network environments are described. Specifically, embodiments of a network analysis method are described that obtains information including but not limited to network traffic and topology information for a network environment including multiple separate networks and physical connections between the networks, generates a network topology model including but not limited to worst-case failure information and/or best-case failure information for routes between networks or between devices in the network environment according to the network topology information, and applies the historical network traffic information to the network topology model to predict future expected normal traffic load and extreme-case traffic load for each route over the physical connections between the networks or devices given a worst-case break, or alternatively a best-case break, for the route. For the purposes of this document, worst-case and best-case breaks may collectively be referred to as extreme-case breaks.

A route may be defined as a particular path through a physical network infrastructure between two networks or devices (e.g., core routers of networks) in the network environment over which traffic (e.g., packets) between the two networks or devices passes. There may be one, two, or more different routes through the physical network infrastructure between a given two networks or devices. Two or more of the routes in the network environment may traverse or share common portions of the physical network infrastructure, for example two routes may traverse a common physical connection such as a fiber optic connection along at least a portion of the routes, may be routed through a common networking device such as a router or switch, and/or may pass through a common physical structure such as a conduit or facility.

In at least some embodiments, output of the network analysis method may include one or more reports for each route, each report indicating the historical and predicted traffic levels for both expected normal and extreme-case break scenarios of a respective route.

Figure 5:
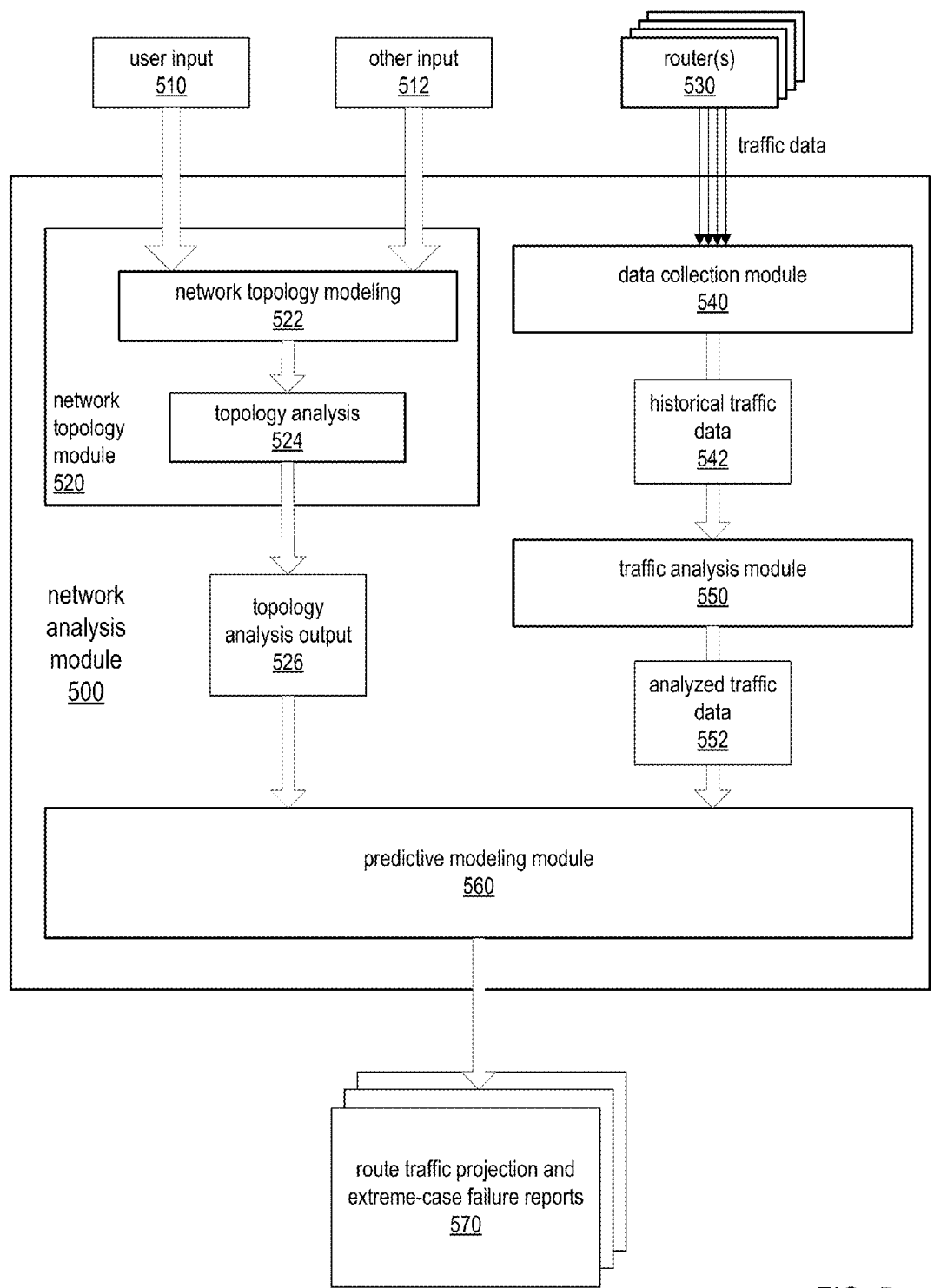
FIG. 5 illustrates an example network analysis module, according to at least some embodiments.
Figure 6A:
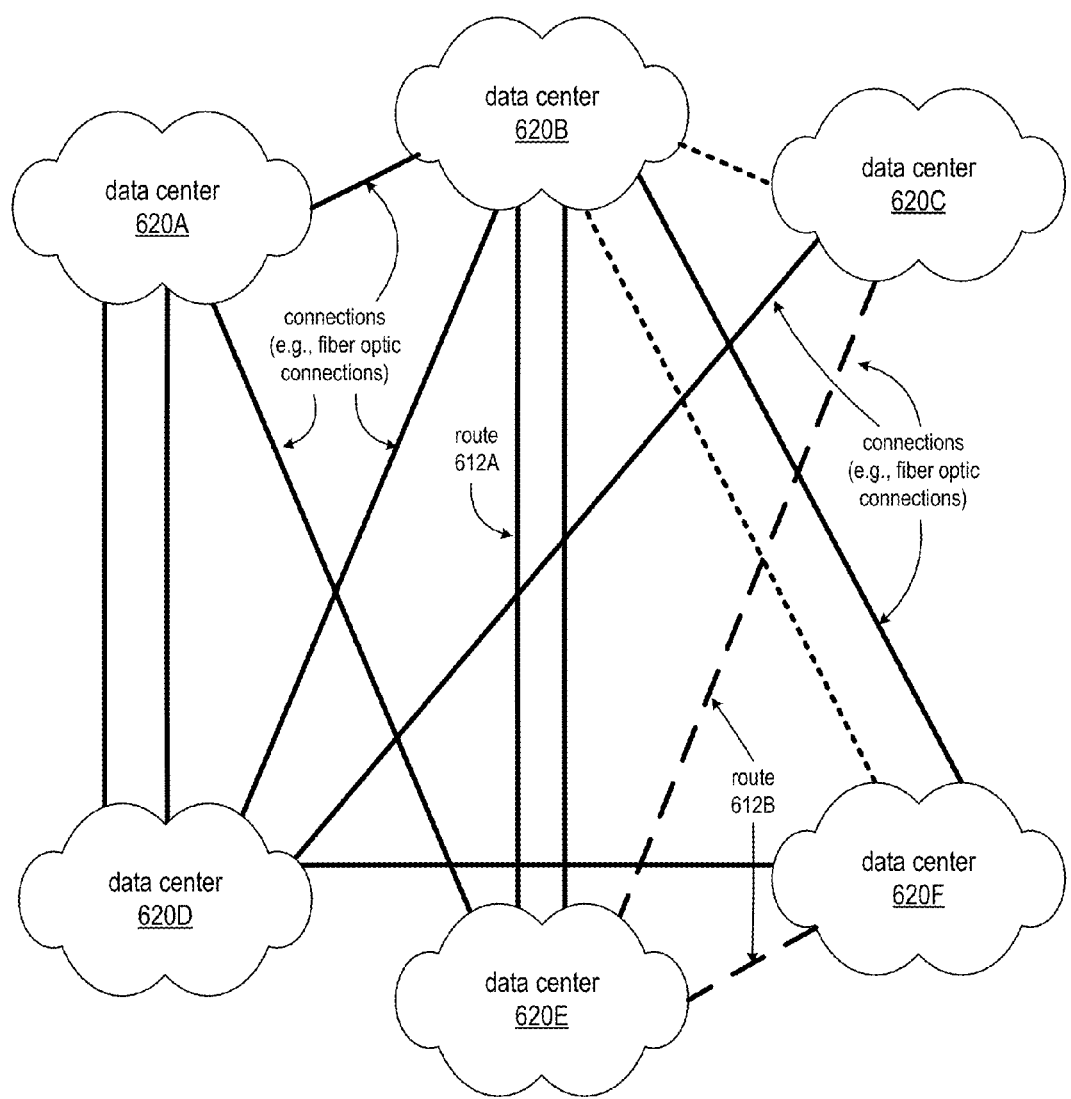
FIGS. 6A through 6C illustrate example network environments in which embodiments of a network analysis method may be implemented.
Figure 6B:
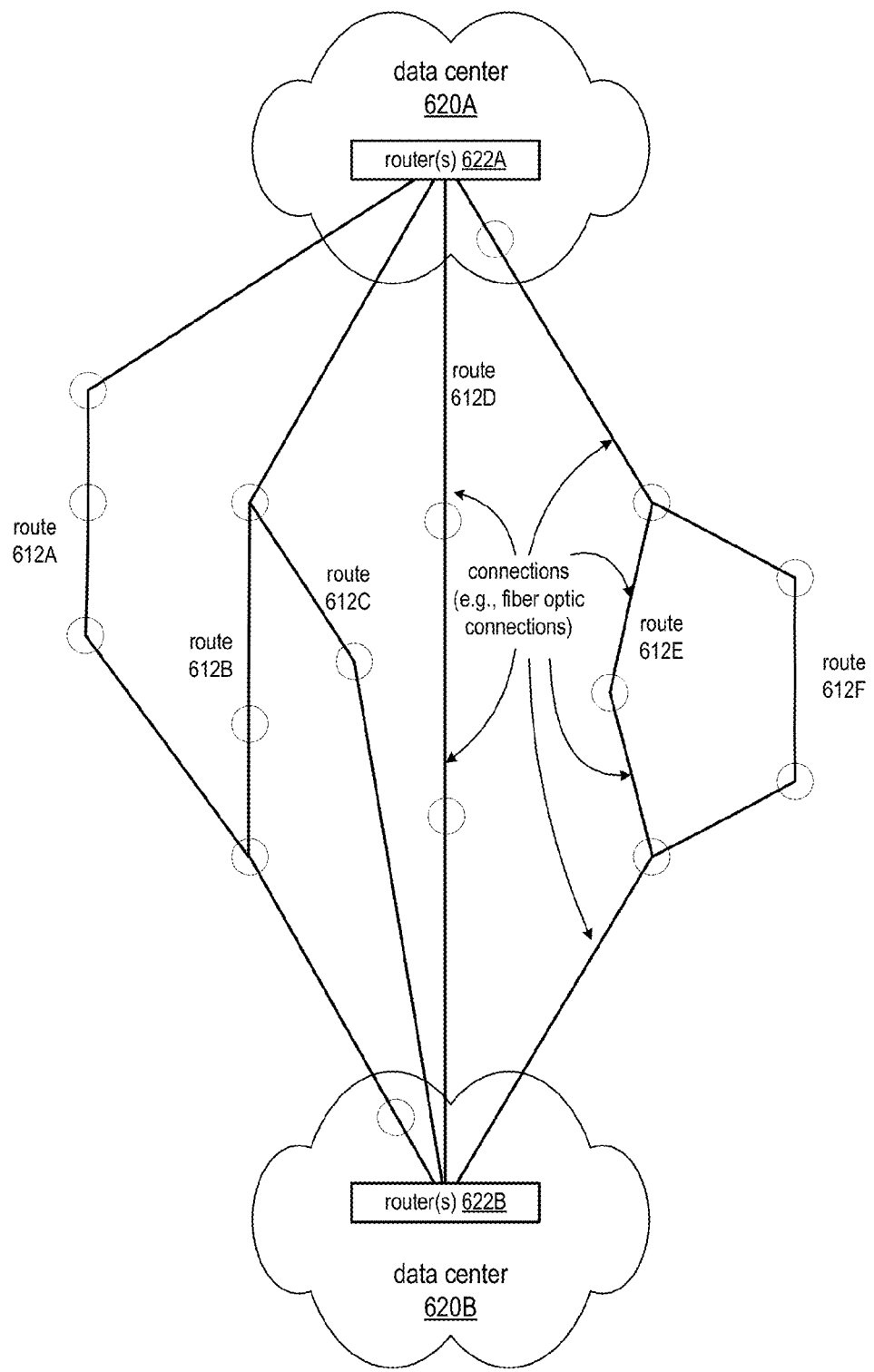
Figure 6C:
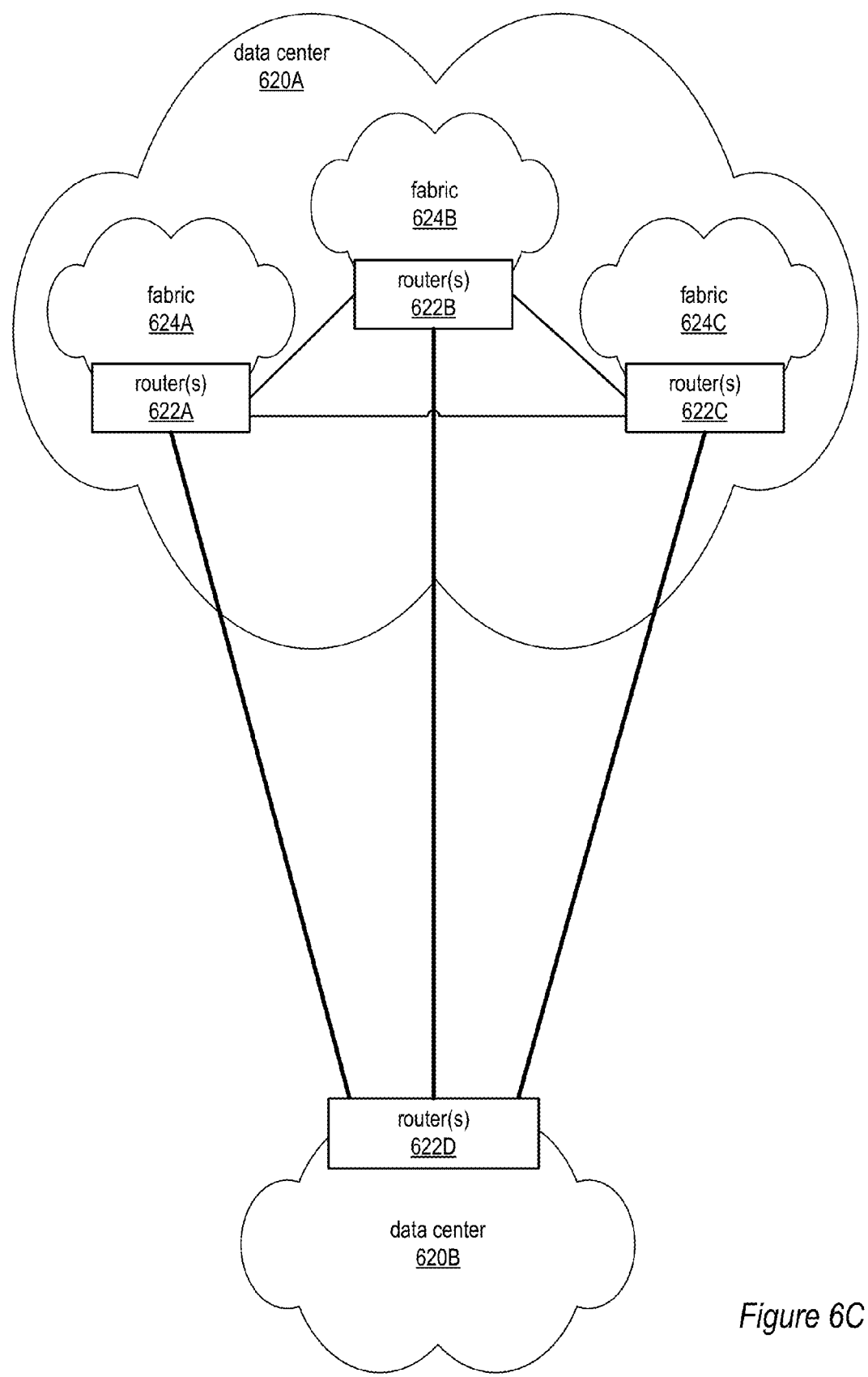
Figure 7:
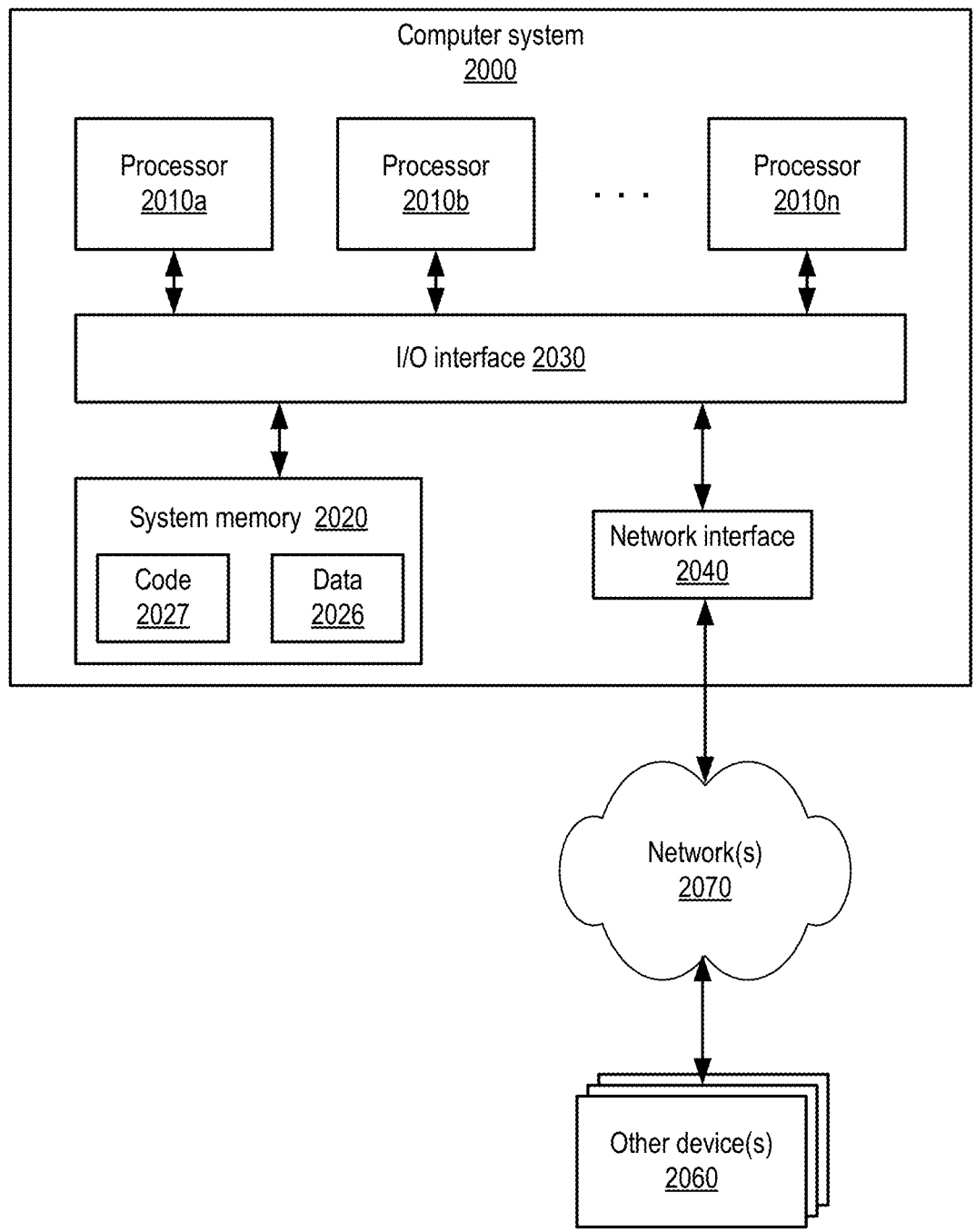
FIG. 7 is a block diagram illustrating an example computer system that may be used in some embodiments.

Embodiments of the network analysis method may be implemented as or in a network analysis module. The network analysis module may be implemented on or by one or more computing systems within the network environment. An example network analysis module is illustrated in FIG. 5. An example computer system on which embodiments of the network analysis module may be implemented is illustrated in FIG. 7. Example network environments in which embodiments may be implemented are illustrated in FIGS. 6A through 6C.

FIG. 1 is a block diagram illustrating example data flow in and operations of a network analysis method, according to at least some embodiments. As shown in FIG. 1, in some embodiments, the network analysis method may include three functional components—network topology modeling and analysis 10, data collection and statistical analysis 20, and predictive modeling 30. Each of these components may, for example, be implemented as a submodule in a network analysis module, as illustrated in FIG. 5. Alternatively, each of these components may be implemented as a separate, stand-alone program or module. Each component 10, 20, and 30 may be implemented in software, hardware, or a combination thereof.

Network Topology Modeling and Analysis

Network topology information may be input to the network topology modeling and analysis 10 component. The network topology information may, for example, include user input or other input (e.g., textual or graphical file input) indicating the physical configuration or layout of the various physical connections between networks in the network environment, as well as information indicating the specific components of each connection (cable spans, networking devices, etc.) along with location information for each component. This physical configuration information may also include, or may be analyzed by the network topology modeling and analysis 10 component to determine, information indicating physical points and/or networking locations at which two or more physical connections converge, for example specific sections of conduit through which two or more fiber optic cables pass, data centers through which two or more fiber optic connections pass, specific networking devices such as routers and switches through which two or more fiber optic connections are routed, and so on.

In addition to the physical configuration information, the network topology information may include routing information, i.e. information indicating a primary route and two or more alternative routes between each of one or more pairs of networks over the physical network infrastructure of the network environment. For example, a primary route between two networks may be, but is not necessarily, a direct physical connection (e.g., a fiber optic connection), between two networks within a data center or in different data centers. An alternative route between two networks may, but does not necessarily, pass through one or more intermediate ones of the networks or data centers in the network environment.

In addition to the physical configuration information and routing information, the input information may include cost or weighting information for the various routes. In at least some embodiments, the costs may be Open Shortest Past First (OSPF) costs. For example, in some embodiments, user input may be used to indicate costs for a primary and for each alternative route between two given networks over the physical network infrastructure of the network environment. In addition, the input information may include capacity or bandwidth information for each physical connection or component thereof, and usage information indicating a normal or expected level of data traffic for at least each primary route between networks.

From the input network topology information, the network topology modeling and analysis 10 component may generate a network topology model or map. As mentioned above, this network topology model may include, but is not limited to, modeling of convergence points (e.g., shared sections of conduit) for the various physical connections in the network environment.

The network topology modeling and analysis 10 component may perform an analysis of the generated network topology model according to the input information (e.g., cost information, capacity information, and usage information). In at least some embodiments, the analysis may be performed according to an Open Shortest Path First (OSPF) protocol model. In at least some embodiments, the analysis may determine, for each route, an extreme-case failure condition, also referred to herein as an extreme-case break, for the respective route, according to an objective function. A failure condition or break for a given route is a failure elsewhere on the network infrastructure defined by the network topology model (e.g., a cut or break in a fiber optic cable or in two or more co-located fiber optic cables, or failure of a networking device such as a router or switch to which one or more fiber optic cables are connected) that causes one or more other routes to go down, resulting in the diversion of at least a portion of the traffic from the other route(s) onto the given route. The extreme-case break for a route may be defined as the particular failure elsewhere on the network infrastructure defined by the network topology model that results in the highest level or cost (i.e., a worst-case break), or alternatively the lowest level or cost (i.e., a best-case break), for one or more route performance metrics being evaluated by the network topology modeling and analysis 10 component according to an objective function. More generally, the extreme-case break for a route may be defined as the particular break for which an objective function characterizing one or more route performance metrics is optimized. The extreme-case break may be a worst-case break determined according to a maximization of the objective function or a best-case break determined according to a minimization of the objective function.

Various route performance metrics may be evaluated according to an objective function in embodiments to determine an extreme-case break for a route. In at least some embodiments, the network topology modeling and analysis 10 component may calculate and evaluate one or more route performance metrics to determine worst-case breaks for routes, where a worst-case break for a route is the break that causes a highest level or cost according to the metric(s) for the route. As one example, a worst-case break may be determined according to the amount of traffic being diverted onto the route; for example, the break that causes the most traffic to be diverted onto the route may be determined as the worst-case break. As another example, a worst-case break may be determined as the break that results in the highest cost according to a latency metric; for example, the break that causes the highest amount of packet latency on the route may be determined as the worst-case break for the route. As another example, a worst-case break may be determined as the break that results in the highest cost according to a monetary metric; for example, the break on the route that would result in the biggest loss in revenues may be determined as the worst-case break for the route. As another example, a worst-case break may be determined as the break that results in the highest cost according to a temporal metric; for example, the break that would affect the route for the longest time may be determined as the worst-case break for the route. As another example, a worst-case break may be determined as the break that results in the highest peak or spike in traffic on the route.

In at least some embodiments, instead of or in addition to calculating and evaluating metric(s) according to an objective function to determine worst-case breaks for routes, the network topology modeling and analysis 10 component may calculate and evaluate one or more route performance metrics to determine best-case breaks for routes, where a best-case break for a route is the break that causes a lowest level or least cost according to the metric(s) for the route. For example, a best-case break may be determined as the break that results in the lowest cost according to a monetary metric or some other metric; for example, the break on the route that would be most cost-efficient to repair may be determined as the best-case break for the route, or the break on the route that would be the most actionable (easiest and/or cheapest to repair) may be determined as the best-case break for the route.

As previously noted, worst-case and best-case breaks may collectively be referred to as extreme-case breaks. The above provides several examples of route performance metrics that may be evaluated to determine extreme-case breaks for routes, and is not intended to be limiting. Other route performance than those given above as examples may be used in some embodiments to determine extreme-case breaks for the routes. In addition, some embodiments may apply different ones of the metrics to different routes, and/or may apply more than one of the metrics to a given route to determine one or more extreme-case breaks for the route.

In at least some embodiments, to determine the extreme-case break for a route, the network topology modeling and analysis 10 component may simulate or otherwise analyze breaks at some or all components (cables, networking devices, etc.) or locations (data centers, conduits, etc.) of some or all of the other routes in the network infrastructure as defined by the network topology model to determine how traffic is diverted, and how much, traffic is diverted, onto the given route for each break. At each simulated break, one or more paths that would be affected by the break are determined, and an amount of data from each affected path that would be diverted onto the path being evaluated is determined. A value for the metric or metrics to be evaluated may be calculated for each simulated break according to how, and how much, traffic is diverted onto the route from the affected route(s) given the break. The extreme-case break may then be determined by analyzing the calculated metric(s) for the simulated breaks according to an objective function. In at least some embodiments, for at least some routes, relevant cost information that was previously input to the network topology modeling and analysis 10 component may be applied when evaluating the simulated breaks according to the metric(s) to determine the extreme-case break for the route.

Note that in some embodiments other methods may be used to analyze the topology model to determine extreme-case breaks than the method that simulates breaks for each route and evaluates the affects of the simulated breaks on the route as described above.

Note that the network topology model may include information indicating co-located portions of various physical connections and/or common networking devices that are parts of two or more routes, as well as facilities through which two or more routes pass, and the analysis preformed by the network topology modeling and analysis 10 component may thus include analysis of single failures at locations in or components of the network infrastructure that may affect two or more routes. For example, the network topology model may indicate that a fiber optic cable of route A and a fiber optic cable of route B both pass through a conduit on a portion of the routes, and the network topology modeling and analysis 10 component may analyze a failure at the conduit, for example a conduit cut, that would result in breakage of both routes A and B.

Route Traffic Data Collection and Statistical Analysis

In at least some embodiments, a data collection and statistical analysis 20 component may collect traffic data for the various routes in the network infrastructure of the network environment. In at least some embodiments, to collect the route traffic data for the routes, the data collection and statistical analysis 20 component may poll or otherwise obtain traffic data from the routers (e.g., core routers) of the networks in the network infrastructure. For example, in some embodiments, Simple Network Management Protocol (SNMP) polling technology may be used to obtain traffic data from the core routers. The core router of a network may be defined as the networking device on the network to which one or more physical connections (e.g., fiber optic connections) used to route traffic between networks are coupled. For a given physical connection between two networks, the core router of each of the two networks may be viewed as an endpoint of the physical connection. Incoming traffic from other networks is received by the core router of a network via the physical connection(s) and routed to one or more destinations on the network by the core router. Similarly, outgoing traffic from the network is received by the core router and routed to one or more of the other networks in the network environment via the physical connection(s).

In at least some embodiments, the data collection and statistical analysis 20 component may periodically or aperiodically poll each core router in the network environment to obtain traffic information for the route(s) between networks in the network environment. For example, in some implementations, the data collection and statistical analysis 20 component may poll each core router every five minutes. In at least some embodiments, the traffic data received by the data collection and statistical analysis 20 component from a core router may indicate, for each route that terminates at the core router, how many data packets were received at the core router via that route since the previous polling event (e.g., in the last five minutes). Instead or in addition, the traffic data may indicate, for each route, how many data packets were sent on that route from the core router since the previous polling event. Alternatively, the traffic data received by the data collection and statistical analysis 20 component from a core router may indicate, for each route that terminates at the core router, how may bits of data were transmitted and/or received by the core router on that route in the previous polling period. The data collection and statistical analysis 20 component may poll the core router at each end of each route between the networks of the network environment to collect traffic data for all of the routes between networks in the network environment. The data collection and statistical analysis 20 component may store the traffic data collected at each polling for each route and/or router, for example to a database on a storage device or storage system, or alternatively may generate, maintain, and store a summary of the traffic data for each route.

In at least some embodiments, the data collection and statistical analysis 20 component may periodically or aperiodically perform a statistical analysis of the collected traffic data for each route to generate traffic statistics for each route, according to the polling period, over an analysis period. For example, the data collection and statistical analysis 20 component may analyze the collected traffic data once a week, or once every two weeks, to generate traffic statistics for the polled data collected during the analysis period (e.g., one week, or two weeks). Alternatively, the data collection and statistical analysis 20 component may, on demand, analyze the historical traffic data within a time frame. Note that the time frame may be subdivided into analysis periods, e.g. one-week periods, with statistics generated for each analysis period. In at least some embodiments, the traffic statistics may include one or more of, but are not limited to:

Historical p99—the $99^{th}$ percentile of the polled traffic data (e.g., 5-minute period traffic data) for each analysis period (e.g., for each week).

Historical max—the p100 or maximum of the polled traffic data (e.g., 5-minute period traffic data) for each analysis period (e.g., for each week).

Historical mean—the mean of the polled traffic data (e.g., 5-minute period traffic data) for each analysis period (e.g., for each week).

In at least some embodiments, the traffic statistics may be generated as bit rates, for example in gigabits per second (Gbps).

Predictive Modeling

In at least some embodiments, a predictive modeling 30 component may periodically or aperiodically obtain and apply historical traffic data collected by the data collection and statistical analysis 20 component over some period (e.g., over five, ten, or more analysis periods, e.g. weeks) to the output from the network topology modeling and analysis 10 component to generate forecasts of traffic load on each route for some specified time into the future, for example three, six, or twelve months into the future. In some embodiments, instead of or in addition to obtaining historical traffic data collected by the data collection and statistical analysis 20 component, the predictive modeling 30 component may obtain at least some route traffic data directly from one or more routers in the network environment, for example from the core routers of the networks in the network environment; the route traffic data thus obtained may be included in the data used to generate the forecasts for the routes.

In at least some embodiments, the forecast of traffic load for each route may include a forecast of traffic load for normal traffic on the route given the historical traffic data for the route, and may also include a forecast of traffic load on the route given the extreme-case break for the route as determined by the network topology modeling and analysis 10 component. In at least some embodiments, the historical p99 traffic data for the route may be used for the normal traffic forecast. In at least some embodiments, the extreme-case traffic forecast for a route may be based on the historical traffic data for the route in addition to the historical traffic data for one or more other routes for which at least a portion of the traffic would be diverted onto the route given the extreme-case failure or break as indicated by the output of the network topology modeling and analysis 10 component.

In at least some embodiments, the historical p99 traffic data for all of the routes involved in the extreme-case break may be used for the extreme-case traffic forecast. In at least some embodiments, the output of the network topology modeling and analysis 10 component may include information indicating, for each particular route, a extreme-case scenario or break. The information may also indicate one or more other routes that are affected by the break, as well as an amount of traffic from each route (or alternatively an aggregate amount of traffic from all routes) affected by the break that would be diverted to the particular route if the break occurred. The predictive modeling 30 component may use this information to estimate, from the historical traffic data obtained from the data collection and statistical analysis 20 component, a total historical (p99) amount of data that would have been carried by the particular route in the extreme-case break for each historical analysis period being analyzed.

For example, assume that the historical p99 on route A for an analysis period is 20 Gbps. Assume that two other routes (routes B and C) are affected by the extreme-case break for route A, as determined by the network topology modeling and analysis 10 component. Assume that the historical p99 for route B for the analysis period is 40 Gbps, and the historical p99 for route C for the analysis period is 15 Gbps. Assume that 50% of the traffic on route B and 100% of the traffic on route C would be rerouted onto route A in the extreme-case break, as determined by the network topology modeling and analysis 10 component. Then the total historical (p99) amount of data that would have been carried by the particular route in the extreme-case break in the analysis period would be 20 Gbps (normal route A traffic)+20 Gbps (diverted route B traffic)+15 Gbps (diverted route C traffic)= 55 Gbps. This calculation would be done for each historical data point (e.g., each historical analysis period) being analyzed.

In at least some embodiments, the normal traffic forecast and/or the extreme-case traffic forecast for a route may be determined according to a smoothing function applied to the historical traffic data, e.g. to the historical p99 traffic data, for some specified time into the future (e.g. six months or one year). In at least some embodiments, a smoothing function according to the autoregressive integrated moving average (ARIMA) model is applied to the historical p99 traffic data to generate the forecasts. An ARIMA model is a statistical model that may be fitted to time series data to predict future points in the series (forecasting). In at least some embodiments, a double exponential smoothing function according to the ARIMA model may be used. However, other smoothing functions, for example an exponential or linear smoothing function according to the ARIMA model, may be used in embodiments. In at least some embodiments, a confidence interval (e.g., a 95% confidence interval) may also be calculated for the normal traffic forecast and/or for the extreme-case traffic forecast for a route.

In at least some embodiments, output of the predictive modeling 30 component may include a route traffic projection 40 for each route in the network environment as indicated by the network topology model. In at least some embodiments, the route traffic projection 40 for each route may include, but is not limited to, the normal traffic forecast and the extreme-case traffic forecast for the respective route.

In at least some embodiments, the output may also include historical traffic statistical for each route. The following section describes example formats for the output route traffic projections 40.

Network Analysis Output

Figure 2:
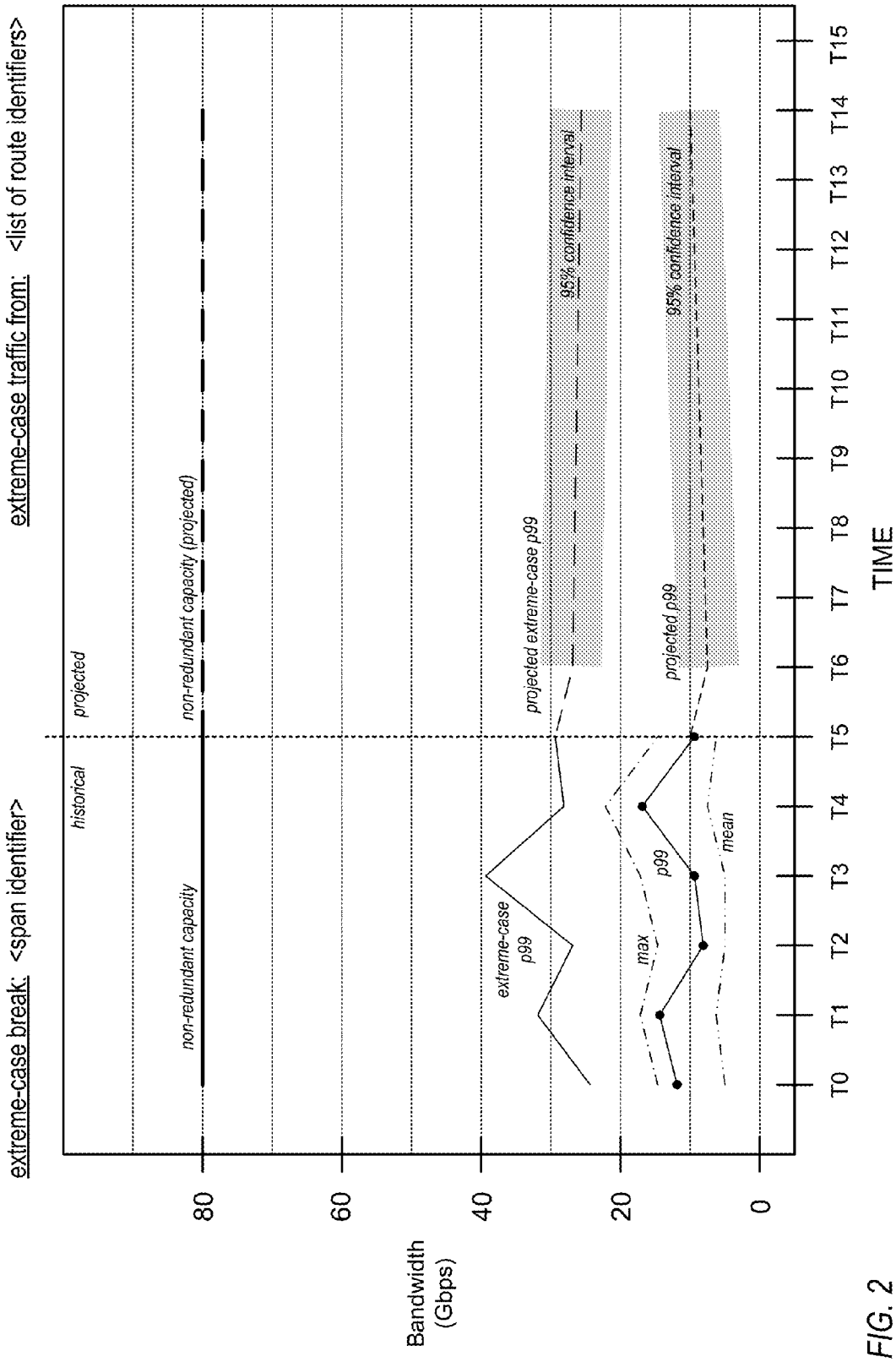
FIG. 2 shows example route traffic projection output for an example route, according to at least some embodiments.
Figure 3:
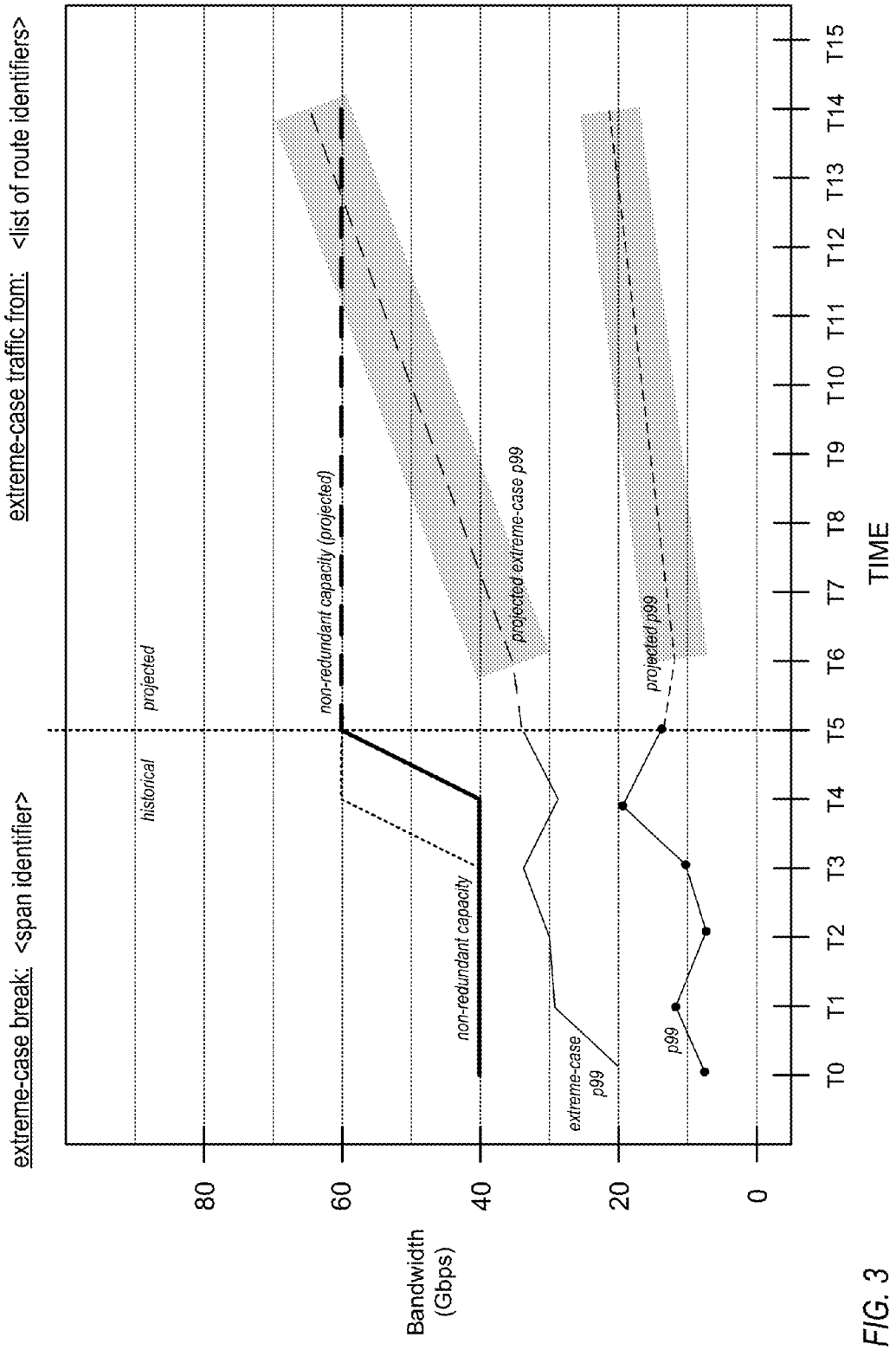
FIG. 3 shows example route traffic projection output for another example route, according to at least some embodiments.

FIGS. 2 and 3 show example route traffic projection output according to an embodiment of a network analysis method as illustrated in FIG. 1, and are not intended to be limiting. The route traffic projection output as shown in FIGS. 2 and 3 may, for example, be displayed to a display screen of a console in one or more of the data centers of the network environment. Instead or in addition, the route traffic projection output may be printed. In some embodiments, the displayed route traffic prediction output may be static. Alternatively, in some embodiments, the route traffic prediction output may be dynamic, and may periodically be updated, for example when an additional analysis is performed by the predictive modeling 30 component of the network analysis method.

Further, FIGS. 2 and 3 show examples of graphical route traffic projection output. Instead or in addition, textual output may be provided. For example, a textual summary report of the route traffic projections including extreme-case break traffic projections for all routes in a network environment may be generated.

FIG. 2 shows example route traffic projection output for an example route, according to at least some embodiments. The route traffic projection information may, for example, be output as a graph or chart, as shown in FIG. 2. In the graph, the X axis is the time axis, and the Y axis is the bandwidth in gigabits per second (Gbps). Each unit on the X axis corresponds to one analysis period, and each tick on the X axis corresponds to a data point. For example, each analysis period may be one week, two weeks, or of some other length. In this example, the first six data points (T0-T5) on the X axis correspond to historical data, while the rest of the X axis corresponds to projected data generated by the predictive modeling 30 component for a forecast period (in this example, ten analysis periods, e.g. 20 weeks if each analysis period is two weeks).

The solid line labeled "p99" graphs the historical p99 (99$^{th}$ percentile) for normal traffic on the respective route. The black dots on the line labeled p99 indicate the p99 (99$^{th}$ percentile) calculated by the data collection and statistical analysis 20 component for the historical data collected over an analysis period. Each black dot indicates the p99 value for the preceding analysis period. For example, in some embodiments, the data collection and statistical analysis 20 component may collect traffic data from the core routers at 5-minute intervals, and each black dot may represent the p99 of the 5-minute traffic (in Gbps, in this example) over the preceding analysis period (e.g., over the previous week) as calculated by the data collection and statistical analysis 20 component.

The dashed and dotted line labeled "mean" graphs the historical mean for normal traffic on the respective route as calculated by the data collection and statistical analysis 20 component. The dashed and dotted line labeled "max" graphs the historical max (p100) for normal traffic on the respective route as calculated by the data collection and statistical analysis 20 component.

The solid line labeled "extreme-case p99" graphs the historical p99 (99$^{th}$ percentile) for traffic on the respective route given the extreme-case break for the route. The extreme-case break may be either a worst-case break or a best-case break. In other words, this line shows the total historical (p99) amount of data that would have been carried by the particular route over the historical portion of the graph given an extreme-case break. The extreme-case historical p99 includes the normal traffic p99 on the respective route in addition to the p99 of any traffic that would have been diverted to the route from one or more other routes given the extreme-case break for the route.

The thick solid line labeled "non-redundant capacity" indicates the historical non-redundant capacity for this route. In this example, the historical non-redundant capacity is 80 Gbps. The thick dashed line labeled "non-redundant capacity (projected)" indicates how much capacity this route is expected to have for the forecast period. Note that, in this example, the route is expected to maintain the same non-redundant capacity for the forecast period.

The dashed line labeled "projected p99" graphs the projection of the p99 for normal traffic on this route which was calculated by the predictive modeling 30 component based on the historical p99 for the route. The gray rectangle represents the 95% confidence level for the projection of the p99 value.

The dashed line labeled "projected extreme-case p99" graphs the projected p99 for extreme-case break traffic on this route which was calculated by the predictive modeling 30 component based on the historical extreme-case p99 for the route calculated by the predictive modeling 30 component. The gray rectangle represents the 95% confidence level for the projection of the extreme-case p99 value.

Note that, in this example, the projected p99 and projected extreme-case p99 for the route are both well below the projected non-redundant capacity for the route over the forecast period.

As shown at the left above the graph in FIG. 2, the route traffic projection output for a route may also indicate a span identifier for the extreme-case break for the route. The span identifier may indicate to the user the location of the extreme-case break for this route in the network infrastructure of the network environment. The route traffic projection output for the route may also include a list of routes from which traffic would be diverted onto the route corresponding to the graph in the extreme-case break, as shown at the right above the graph in FIG. 2.

FIG. 3 shows example route traffic projection output for another example route, according to at least some embodiments. This example output is similar to that shown in FIG. 2. However, in this example, the historical mean and max values are not shown on the graph. In this example, the historical non-redundant capacity was originally at 40 Gbps, but was recently increased to 60 Gbps. Also in this example, the p99 and the extreme-case p99 are both projected to increase over the forecast period. In particular, note that the extreme-case p99 is projected to increase until it exceeds the projected non-redundant capacity in the forecast period.

This projection may, for example, indicate to a network engineer that the network infrastructure may need to be modified to maintain sufficient data routing between networks in an extreme-case scenario or break for this particular route. Note that similar route traffic projection output may be generated and displayed for each route in the network environment. Network engineers may view all of these projections to determine where in the network extreme-case breaks for each route may occur, and which routes may not currently have the capacity to handle the respective extreme-case breaks. The network engineers may then develop and implement a plan to address potential future problems in the network environment as indicated by the output of the network analysis method.

Thus, embodiments may provide an automated network analysis method that can analyze the complex network infrastructure of a network environment and provide graphical and/or textual output that network engineers can view to determine and address current or potential future problems in the network infrastructure of a network environment.

Network Analysis Method Flowchart

Figure 4:
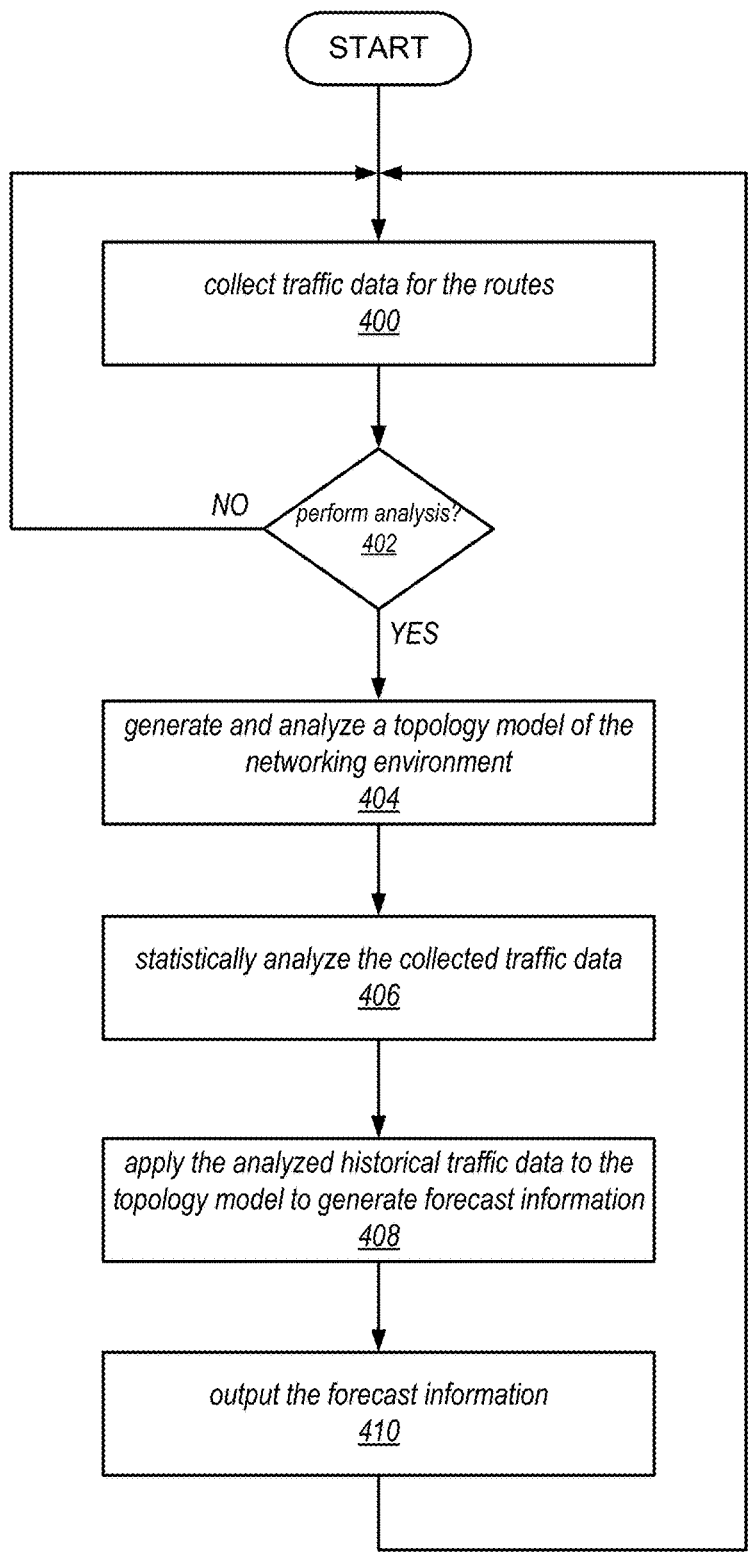
FIG. 4 is a high-level flowchart of a network analysis method, according to at least some embodiments.

FIG. 4 is a high-level flowchart of a network analysis method, according to at least some embodiments. Example network environments in which embodiments may be applied are shown in FIGS. 6A-6C. As indicated at 400, traffic data may be collected for the routes between networks in the network environment, for example from the core router of each network in the network environment. For example, a data collection process or module may periodically or aperiodically poll the core routers, for example using SNMP polling technology, to collect the traffic data. In an example implementation, the data collection process or module may poll each core router every five minutes. In at least some embodiments, the traffic data collected from a given core router indicates how much data has been received by the core router since the last poll, or for the polling period (e.g., five minutes) for each route that terminates at the core router. Instead or in addition, the traffic data may indicate how much data has been transmitted by the core router on each route. In some embodiments, the traffic data received from the core routers may be expressed in bit rates, for example in gigabits per second (Gbps). Alternatively, the received traffic data may be otherwise expressed, and may be converted to bit rates (e.g., Gbps). The collected traffic data may be stored to a storage device or storage system, for example in a database. See the section titled Route traffic data collection and statistical analysis for further description of a method for collecting route traffic data.

At 402, a network analysis may be periodically or aperiodically performed in which the collected traffic data may be applied to a topology model of the network environment to generate forecasts of traffic flow on the routes between the networks of the network environment. In at least some embodiments, the network analysis may be manually or automatically initiated at a given analysis interval, for example every week or every two weeks. For example, the network analysis may be initiated by a job in a job queue that is scheduled to execute at periodic intervals. Instead or in addition, the network analysis may be performed on demand in response to user input. The forecast for each route may include both a forecast of normal traffic flow for the route based on the historical traffic data collected for the route over a period and a forecast of extreme-case break traffic flow for the route based on the historical traffic data collected for the route and one or more other routes that would be affected by the extreme-case break. Elements 404 through 410 show operations that may be performed as part of the network analysis. Note that data collection 400 may continue during the network analysis.

As indicated at 404, a topology model of the network environment may be generated and analyzed. From input network topology information, a network topology modeling and analysis process or module generates a network topology model or map. The network topology model may include, but is not limited to, modeling of convergence points (e.g., shared sections of conduit) for the various physical connections in the network environment. The network topology modeling and analysis method may perform an analysis of the generated network topology model according to input information (e.g., cost information, capacity information, and usage information). In at least some embodiments, the analysis may be performed according to an Open Shortest Path First (OSPF) protocol model. The analysis may determine, for each route, a extreme-case failure condition or break. See the section titled Network topology modeling and analysis for further description of a method for generating and analyzing a topology map.

While element 404 is shown in FIG. 4 as being performed as part of the network analysis process initiated at 402, in practice the network topology modeling and analysis may be performed at any time prior to element 408. Further, the network topology modeling and analysis may be performed once to generate topology analysis output, and the output may be used as input for two or more executions of the network analysis process. Thus, element 404 is not necessarily performed for every network analysis. In practice, the network topology modeling and analysis may only be performed when necessary or desired, for example when there is some change to the physical network infrastructure or when there is some change to other input (e.g., cost or usage information) that needs to be modeled.

As indicated at 406, the collected traffic data may be statistically analyzed. For example, statistical analysis process or method may be applied to the collected traffic data for each route to generate traffic statistics for each route, according to the polling period (e.g., 5 minutes), over one or more analysis periods (e.g., one or more weeks). In at least some embodiments, the traffic statistics may include one or more of, but are not limited to:

Historical p99—the $99^{th}$ percentile of the polled traffic data (e.g., 5-minute period traffic data) for each analysis period (e.g., for each week).

Historical max—the p100 or maximum of the polled traffic data (e.g., 5-minute period traffic data) for each analysis period (e.g., for each week).

Historical mean—the mean of the polled traffic data (e.g., 5-minute period traffic data) for each analysis period (e.g., for each week).

See the section titled Route traffic data collection and statistical analysis for further description of a method for statistically analyzing the collected route traffic data.

While element 406 is shown in FIG. 4 as being performed as part of the network analysis process initiated at 402, in practice the statistical analysis of the collected traffic data may be performed at any time prior to element 408.

As indicated at 408, the analyzed historical traffic data may be applied to the topology model to generate forecast information. A predictive modeling process or method may obtain and apply the analyzed historical traffic data over some period (e.g., over five, ten, or more analysis periods, e.g. weeks) to the output of the network topology modeling and analysis process (element 404) to generate forecasts of traffic load on each route for some specified time into the future, for example three, six, or twelve months into the future. In at least some embodiments, a normal traffic forecast and a extreme-case forecast for each route may be determined according to a smoothing function, for example a smoothing function according to the autoregressive integrated moving average (ARIMA) model applied to the historical traffic data, e.g. to the historical p99 traffic data, for some specified time into the future (e.g. six months or one year). In at least some embodiments, a double exponential smoothing function may be used. However, other smoothing functions, for example an exponential or linear smoothing function, may be used in embodiments. In at least some embodiments, a confidence interval (e.g., a 95% confidence interval) may also be calculated for the normal traffic forecast and for the extreme-case traffic forecast for each route. See the section titled Predictive modeling for further description of a method for generating the forecast information from the historical traffic data and the topology modeling and analysis output.

As indicated at 410, the forecast information may be output. In at least some embodiments, the output of element 408 may include a route traffic projection for each route in the network environment as indicated by the network topology model. In at least some embodiments, the route traffic projection for each route may include, but is not limited to, the normal traffic forecast and the extreme-case traffic forecast for the respective route. In at least some embodiments, the output may also include historical traffic statistical for each route. The output may, for example, be a graphical chart for each route that is or can be displayed to a display screen of a console in one or more of the data centers of the network environment. Instead or in addition, the output may be in textual format, for example a summary report for all of the routes, that can be displayed or printed.

See the section titled Predictive modeling for further description of output of the network modeling process. FIGS. 2 and 3 show examples of graphical route traffic projection output.

Example Network Analysis Module

Some embodiments may include a means for predicting route utilization and non-redundant failures in network environments according to embodiments of a network analysis method described herein. For example, a network analysis module may implement a network analysis method as illustrated in FIGS. 1 through 4 to generate and analyze a network topology model including but not limited to extreme-case failure or break information for routes in the network environment and apply historical network traffic information to the network topology model to predict future expected normal traffic load and extreme-case traffic load for each route over the physical connections between networks or data centers in the network environment. The network analysis module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform one or more of the techniques as described herein. Other embodiments of the module may be at least partially implemented by hardware circuitry and/or firmware stored, for example, in a non-volatile memory. An example computer system on which the network analysis module may be implemented is illustrated in FIG. 6.

FIG. 5 illustrates an example network analysis module 500 that may implement embodiments of a network analysis method, for example as illustrated in FIGS. 1 through 4. An example computer system on which the module 500 may be implemented is illustrated in FIG. 7. The network analysis module 500 may include one or more submodules, for example a network topology module 520, a data collection module 540, a traffic analysis module 550, and a predictive modeling module 560. In at least some embodiments, a network topology module 520 of the network analysis module 500 obtains user input 510 and/or other input 512. The input 510 and 512 may include network traffic and network topology information for a network environment that includes multiple separate networks and physical connections or routes between the networks. The input may also include other information such as cost information for the routes. In at least some embodiments, a network topology modeling component 522 of the network topology module 520 generates a network topology model from the input information, and a topology analysis component 524 of the network topology module 520 analyzes the model according to the input to generate topology analysis output 526 including but not limited to extreme-case break information for routes in the network environment.

In at least some embodiments, a data collection module 540 collects and stores traffic data from core routers 530 of the networks in the network environment. In at least some embodiments, a traffic analysis module 550 performs statistical analysis of historical traffic data 542 collected and stored by the data collection module 540 to generate analyzed traffic data 552 that includes statistics such as historical mean, historical max, and historical p99 for each route in the network environment. In at least some embodiments, a predictive modeling module 560 applies the analyzed historical network traffic data 552 (e.g., the historical p99 data) to the topology analysis output 526 to generate forecasts of expected normal traffic load and extreme-case traffic load for each route over the physical connections between the networks. In at least some embodiments, the predictive modeling module 560 implements a smoothing function according to the autoregressive integrated moving average (ARIMA) model that is applied to the analyzed historical network traffic data 552 to generate the forecasts. In at least some embodiments, a double exponential smoothing function according to the ARIMA model may be used. However, other smoothing functions, for example an exponential or linear smoothing function according to the ARIMA model, may be used in embodiments. Output of the network analysis module 500 may include at least one route traffic projection and extreme-case failure report 570 for each route, each report 570 indicating at least the historical and predicted traffic levels for both expected and extreme-case break scenarios of a respective route. Example reports are shown in FIGS. 2 and 3.

In some embodiments, instead of or in addition to obtaining historical traffic data collected and stored by the data collection module 540 for analysis, the traffic analysis module 550 may obtain at least some route traffic data directly from one or more routers in the network environment, for example from the core routers of the networks in the network environment. The route traffic data thus obtained may be statistically analyzed, and the analyzed data may then be used by the predictive modeling module 560 in generating the forecasts for the routes.

Example Network Environments

FIGS. 6A through 6C illustrate example network environments in which embodiments of a network analysis method and module as illustrated in FIGS. 1 through 5 may be implemented. A network environment may include two or more separate networks each including numerous computing systems and networking devices, with physical connections, for example fiber optic connections, that provide connectivity between the separate networks. Embodiments of the network analysis method may be implemented in such an environment to predict route utilization and non-redundant failures between networks (e.g., between core routers) in the network environment.

Note that these examples are not intended to be limiting. Embodiments of the networking analysis method as illustrated in FIGS. 1 through 5 may be implemented in other types of computing and/or network environments to predict route utilization and non-redundant failures. For example, embodiments may be adapted to operate within a single network to predict utilization and non-redundant failures on physical connections or routes between devices (e.g., servers, storage devices, networking devices such as load balancers or routers, etc.) within the network.

FIG. 6A illustrates an example in which networks in several data centers 620A through 620F are each connected to at least one other network in another data center 620 via at least one physical connection such as a fiber optic connection. Each line between two data centers 620 represents a separate physical connection such as a fiber optic connection. A networking device on a network in a data center 620 that is physically connected to one or more other networks 620 via the physical connections may generally be referred to as a core router. Note that each data center 620 may include one, two, or more distinct networks, and each distinct network in a data center may have its own core router(s) and may connect to one or more other networks in the same data center 620 or in other data centers 620 via physical connections such as fiber optic connections. See FIG. 6C for an example. Also note that a given connection, e.g. a fiber optic connection, between two core routers is not necessarily a single continuous cable; instead, such a connection may include two or more sections of cable that interconnect between nodes such as networking devices, for example routers, repeaters, switches, and so on, on the path between the core routers. See FIG. 6B for an example.

In some cases, a telecommunications provider, also referred to as a transit provider, may provide one or more physical connections or portions thereof, e.g. fiber optic cables, between core routers on the entity's networks including core routers of networks located in geographically dispersed data centers 620. A transit provider may in some cases provide multiple such connections (e.g., separate fiber optic connections) to link the entity's networks, and two or more of the connections may pass through one or more of the same geographic locations, facilities, paths, conduits, networking devices (e.g., routers and switches), etc. on their routes between the core routers. The entity may lease or otherwise acquire a physical connection or a portion (in bandwidth) thereof from a transit provider. In some cases, the entity may acquire a portion (in bandwidth) of a connection that is shared with one or more other entities. One or more of the routes between networks in the entity's network infrastructure may traverse a given transit provider physical connection. In some cases, for example, the entity may lease or otherwise acquire from a transit provider a portion of the bandwidth of a fiber-optic connection on which data between two or more of the entity's networks may be carried, for example 80 or 160 gigabits per second (Gbps) may be leased. On these shared connections, various technologies may be used to multiplex data from multiple sources. For example, on fiber optic connections, wavelength-division multiplexing (WDM), coarse wavelength division multiplexing (CWDM), or dense wavelength division multiplexing (DWDM) technology may be used by the transit provider and/or the entity to multiplex data from multiple sources.

The entity's networks, including but not limited to networks in different data centers, may instead or also be connected via physical connections such as a fiber optic connections that are not provided or not managed by a transit provider, and that are also connected to core routers on the respective networks. These connections, which may be referred to as peer connections, may, for example, be established, owned, and operated by the entity itself rather than by a third-party transit provider. Note, however, that a peer connection may be established over a physical connection that is at least in part provided by a third party such as a transit provider. For example, a transit provider may provide a "backbone" that may provide a portion of the route(s) between core routers on the entity's networks. Typically, each core router would be coupled to at least one edge router of the transit provider network that implements the backbone to gain access to the backbone.

A peer connection between two data centers 620 may, but does not necessarily, pass through another data center 620. For example, referring to FIG. 6A, a fiber optic connection between a network in data center 620C and a network in data center 620F may pass through one or more networking devices and/or cables located at data center 620E, as shown by the two dashed lines. Note that another fiber optic connection between a network in data center 620C and a network in data center 620F may pass through one or more networking devices and/or cables located at data center 620B, as shown by the two dotted lines. In some cases two or more of the various peer connection may pass through one or more of the same geographic locations, facilities (e.g., data centers), paths, conduits, networking devices (e.g., routers and switches), etc. on their routes between the networks' core routers. In addition, on their routes between the core routers, the peer connections may in some cases pass through one or more of the same geographic locations, facilities, data centers, paths, conduits, networking devices (e.g., routers and switches), etc. as do one or more transit provider cables or connections.

One or more of an entity's peer connections may carry data from multiple sources. For example, two or more of the routes between networks in the entity's network infrastructure may traverse a single peer connection. On shared peer connections, various technologies may be used to multiplex data from the multiple sources. For example, on fiber optic peer connections, wavelength-division multiplexing (WDM), coarse wavelength division multiplexing (CWDM), or dense wavelength division multiplexing (DWDM) technology may be used.

Note that a route between networks may be established on a direct physical connection between two data centers 620, such as route 612A between data centers 620B and 620E, or alternatively may pass through one or more other data centers 620, such as route 612B between data centers 620C and 620F, which passes through data center 620E. There may be two or more possible routes between any two networks using the connections as shown in FIG. 6A. Generally, one route may be designated as a primary route, and one or more other routes may be designated as alternative routes. A failure on a primary route between networks (e.g., a cut in a fiber optic cable somewhere on the route) may result in traffic for the route being diverted onto the one or more alternative routes.

FIG. 6B illustrates example routes between networks in two data centers. Core routers 622A and 622B of networks in data centers 620A and 620B, respectively, are physically connected via multiple routes 612. Each route 612 may pass through one or more nodes (represented by the circles) within or between the two data centers 622A and 622B. Each node may represent a switch, router, repeater computer system, or other networking component, or alternatively may represent another network, a data center, a facility, a conduit, etc. In some cases one or more of the routes 612 between the data centers 620A and 620B may pass through one or more of the same nodes on their routes between the core routers 622A and 622B as do one or more others of the routes 612 between the data centers 620A and 620B. In addition, routes between either data centers 620A or data center 620B and one or more other data centers 620 in the network environment may pass through the same nodes as do the routes 612 between the data centers 620A and 620B.

In this example, route 612D may be designated as a primary route between a network in data center 620A and a network in data center 620B, and one or more other routes 612 may be designated as alternative routes between the networks. A failure on route 612D may result in traffic for the route to be diverted onto the one or more alternative routes. In addition, another route, e.g. route 612A, may be a primary route between another network in data center 620A and another network in data center 620B. A failure on route 612D may result in at least a portion of the traffic of route 612D to be diverted onto route 612A. Similarly, a failure on route 612A may result in traffic being diverted onto route 612D. Note that a failure at some of the nodes potentially results in two or more of the routes 612 going down. For example, the physical fiber optic cables of two of the routes 612 may pass through the same conduit over a portion of the path between the data centers 620A and 620B, and damage to this conduit may result in both cables being cut.

FIG. 6C illustrates a data center that includes multiple separate networks or fabrics that may be interconnected within the data center by routes established over physical connections such as fiber optic connections, and that also be connected to other networks or fabrics in other data centers by routes established over physical connections such as fiber optic connections, according to at least some embodiments. Data center 620A includes three networks or fabrics 624A, 624B, and 624C. Each fabric 624 is interconnected with each other fabric 624 via at least one physical connection (e.g., a fiber optic connection) between the respective core routers 622A, 622B, and 622C. In addition, each fabric 624 in data center 620A may be connected to one or more fabrics in data center 620B by at least one physical connection to core routers 622(s). Routes between the fabrics may be established over the physical connections between the routers 622. A route between two fabrics 624 may be over a direct connection between the fabrics' core routers 622, or alternatively may pass through one or more other routers 622 between the fabrics 624. Thus, there may be multiple possible routes between any two fabrics 624. Generally, one route between two fabrics 624 may be designated as a primary route, and one or more other routes may be designated as alternative routes. A failure on a primary route between the fabrics (e.g., a cut in a fiber optic cable somewhere on the route) may result in traffic for the route being diverted onto the one or more alternative routes.

Illustrative System

In at least some embodiments, a server that implements a portion or all of the network analysis method and network analysis module as described herein may include a general-purpose computer system that includes or is configured to access one or more computer-accessible media, such as computer system 2000 illustrated in FIG. 7. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for the network analysis method and network analysis module, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 6C, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 5 for implementing embodiments of a network analysis method and network analysis module. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
    performing, by one or more computing devices:
        obtaining historical traffic load data for individual routes of a plurality of routes between a plurality of devices in a network environment, wherein the network environment connects the plurality of devices via a plurality of physical connections, and each individual route of the plurality of routes carries traffic between two devices of the plurality of devices over one or more of the plurality of physical connections between the two devices;
        obtaining a topology model of the network environment, wherein the topology model includes, for each particular route of the plurality of routes, an indication of a failure-case according to the topology model, wherein the failure-case for a particular route is a failure in one or more of the plurality of physical connections that causes traffic to be diverted onto the particular route from one or more other routes of the plurality of routes affected by the failure; and
        generating, for each particular route of the plurality of routes, a prediction of failure-case traffic load on the particular route given the failure-case for the particular route according to the historical traffic load data for the plurality of routes and the topology model.

2. The method as recited in claim 1, further comprising generating a prediction of normal traffic load for each of the plurality of routes according to the historical traffic load data.

3. The method as recited in claim 1, further comprising, prior to said generating the prediction, performing a statistical analysis of the historical traffic load data to generate historical 99$^{th}$ percentile (p99) data for each individual route of the plurality of routes, wherein the prediction of failure-case traffic load is generated according to the historical p99 data.

4. The method as recited in claim 1, wherein said generating a prediction of failure-case traffic load comprises:
    determining, from the topology model and the historical traffic load data, an amount of historical traffic load that would be diverted from one or more other routes to the particular route given the failure-case;
    combining the historical traffic load data for the particular route with the determined amount of historical traffic load that would be diverted to the particular route given the failure-case to produce a combined historical traffic load; and
    generating the prediction of failure-case traffic load on the particular route from the combined historical traffic load.

5. The method as recited in claim 4, wherein said generating the prediction of failure-case traffic load on the particular route comprises applying a smoothing function according to an autoregressive integrated moving average (ARIMA) model to the combined historical traffic load.

6. The method as recited in claim 1, wherein said obtaining the topology model of the network environment comprises determining one or more locations in a topology of the network environment at which two or more of the plurality of physical connections are co-located, wherein the failure-case for at least one route is a break at a location of the one or more locations, and wherein the break affects two or more co-located physical connections co-located at the location.

7. The method as recited in claim 1, further comprising:
    simulating two or more breaks at different locations in the topology model that would cause traffic to be diverted onto the particular route;
    for each particular break of the simulated breaks:
        determining an amount of traffic that would be diverted onto the particular route from one or more other routes given the particular break; and
        determining values for one or more route performance metrics according to the determined amount of traffic that would be diverted onto the particular route given the particular break; and
    analyzing the values for the one or more route performance metrics for each of the simulated breaks to determine an extreme-case break for the particular route.

8. The method as recited in claim 1, further comprising:
    determining that the failure-case for the particular route is an extreme-case break based on an optimization of one or more route performance metrics according to an objective function, wherein the extreme-case break is a break that causes a highest total traffic load on the particular route according to the objective function.

9. A non-transitory computer-accessible storage medium storing program instructions, wherein the program instructions are computer-executable to implement:
    obtaining historical traffic load data for individual routes of a plurality of routes between a plurality of devices in a network environment, wherein the network environment connects the plurality of devices via a plurality of physical connections, and each individual route of the plurality of routes carries traffic between two devices of the plurality of devices over one or more of the plurality of physical connections between the two devices;
    obtaining a topology model of the network environment, wherein the topology model includes, for each particular route of the plurality of routes, an indication of a failure-case according to the topology model, wherein the failure-case for a particular route is a failure in one or more of the plurality of physical connections that causes traffic to be diverted onto the particular route from one or more other routes of the plurality of routes affected by the failure; and generating, for each particular route of the plurality of routes, a prediction of failure-case traffic load on the particular route given the failure-case for the particular route according to the historical traffic load data for the plurality of routes and the topology model.

10. The non-transitory computer-accessible storage medium as recited in claim 9, wherein at least one of the plurality of devices is a router of a distinct network in the network environment, the network environment comprising a plurality of networks.

11. The non-transitory computer-accessible storage medium as recited in claim 9, wherein, in said generating a prediction, the program instructions are computer-executable to implement generating the prediction of failure-case traffic load based at least in part on historical traffic load for the particular route combined with an amount of historical traffic load that would be diverted to the particular route from one or more other routes given the failure-case.

12. The non-transitory computer-accessible storage medium as recited in claim 9, wherein the topology model further indicates one or more locations at which two or more of the plurality of physical connections are co-located, wherein the failure-case for at least one route is a break at a location of the one or more locations, and wherein the break affects two or more co-located physical connections at the location.

13. The non-transitory computer-accessible storage medium as recited in claim 9, wherein the failure-case is one of a worst-case break determined according to a maximization of an objective function according to the topology model or a best-case break determined according to a minimization of the objective function according to the topology model.

14. A system, comprising:
one or more hardware computing devices configured to implement a network analysis module configured to:
obtain historical traffic load data for individual routes of a plurality of routes between a plurality of devices, wherein the plurality of devices are connected via a plurality of physical connections, and each individual route of the plurality of routes carries traffic between two devices of the plurality of devices over one or more of the plurality of physical connections between the two devices;
obtain a topology model of the plurality of devices and the plurality of routes between the plurality of devices, wherein the topology model includes, for each particular route of the plurality of routes, an indication of a failure-case according to the topology model, wherein the failure-case for a particular route is a failure in one or more of the plurality of physical connections that causes traffic to be diverted onto the particular route from one or more other routes of the plurality of routes affected by the failure; and
generate, for each particular route of the plurality of routes, a prediction of failure-case traffic load on the particular route given the failure-case for the particular route according to the historical traffic load data for the plurality of routes and the topology model.

15. The system as recited in claim 14, wherein at least one of the plurality of physical connections is a fiber optic connection.

16. The system as recited in claim 14, wherein each of the plurality of physical connections connects a router of one network to a router of another network.

17. The system as recited in claim 14, wherein, to generate the prediction of failure-case traffic load, the network analysis module is further configured to apply a smoothing function according to an autoregressive integrated moving average (ARIMA) model to historical p99 data for the particular route.

18. The system as recited in claim 14, wherein, to generate the prediction of failure-case traffic load, the network analysis module is further configured to generate the prediction of failure-case traffic load on the particular route based at least in part on the historical traffic load for the particular route combined with an amount of historical traffic load that would be diverted to the particular route from one or more other routes given the failure-case.

19. The system as recited in claim 14, wherein the topology model further indicates one or more locations at which two or more of the plurality of physical connections are co-located, and wherein the failure-case for at least one route is a break at a location of the one or more locations, and wherein the break affects two or more co-located physical connections at the location.

20. The system as recited in claim 14, wherein the failure-case break is one of a worst-case break determined according to a maximization of an objective function according to the topology model or a best-case break determined according to a minimization of the objective function according to the topology model.

* * * * *